J. A. KOHN.
CLAMP.
APPLICATION FILED JUNE 1, 1920.
1,376,284.
Patented Apr. 26, 1921.
2 SHEETS—SHEET 1.
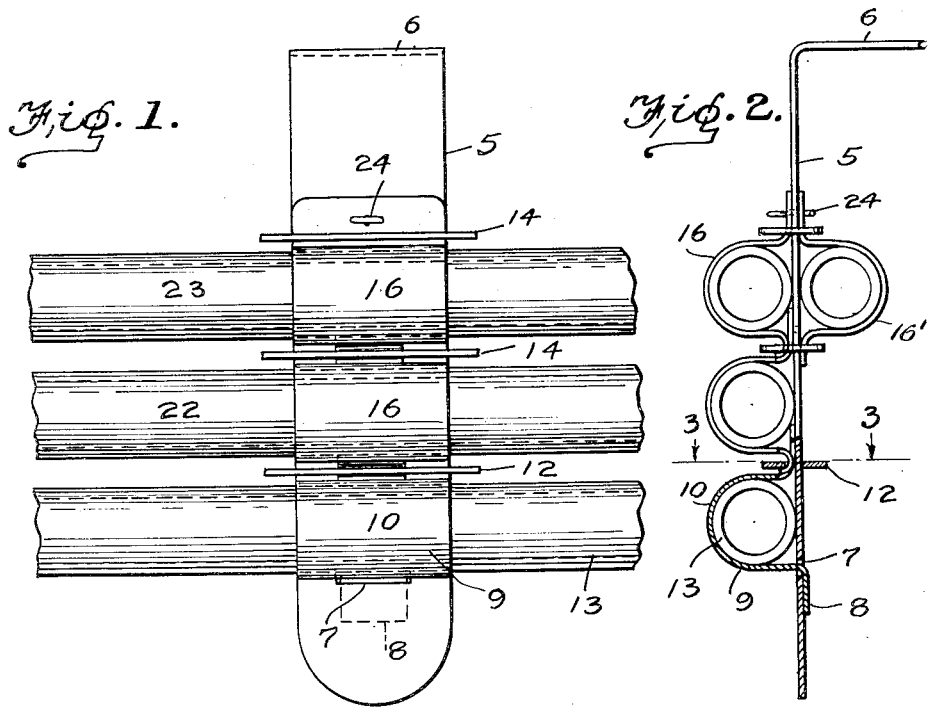
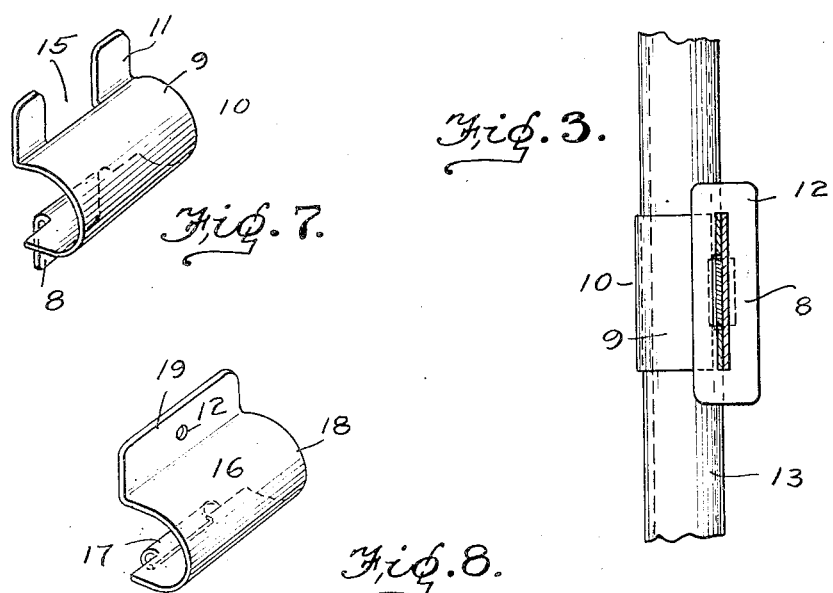
John A. Kohn
INVENTOR
BY Victor J. Evans
ATTORNEY

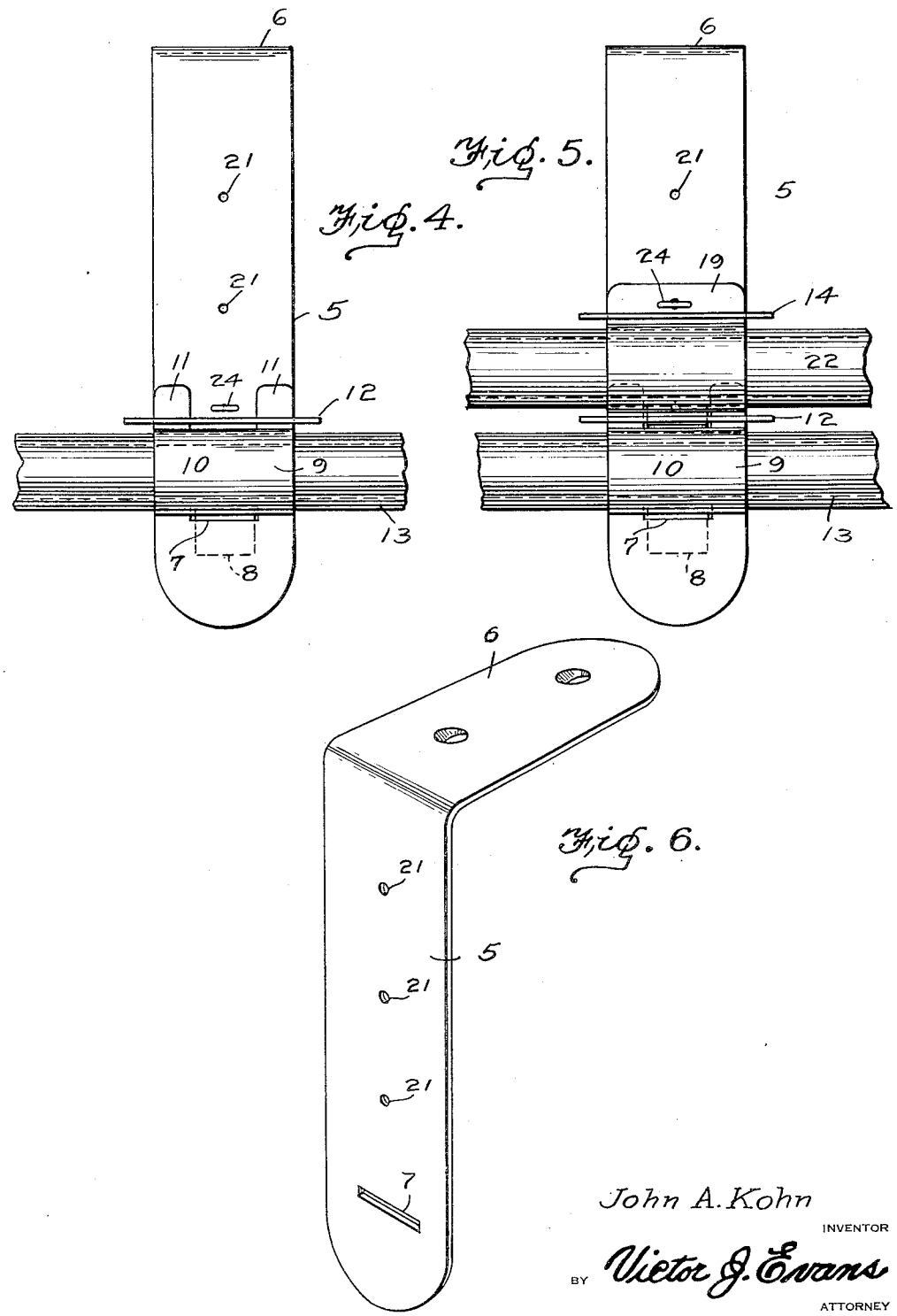

UNITED STATES PATENT OFFICE.

JOHN A. KOHN, OF NORTH FOND DU LAC, WISCONSIN.

CLAMP.

1,376,284.  Specification of Letters Patent.  Patented Apr. 26, 1921.

Application filed June 1, 1920. Serial No. 385,666.

*To all whom it may concern:*

Be it known that I, JOHN A. KOHN, a citizen of the United States, residing at North Fond du Lac, in the county of Fond du Lac and State of Wisconsin, have invented new and useful Improvements in Clamps, of which the following is a specification.

The present invention has reference to a means for clamping one or a plurality of pipes on a hanger.

The improvement is primarily designed for supporting air, steam and water pipes on railway rolling stock, and has for its primary object to provide an extremely simple means, coacting with a hanger whereby the pipes may be removably clamped on the hanger, and when so clamped held in a firm and efficient manner.

Other objects and advantages will present themselves when the nature of the invention is better understood, reference being had to the drawings in which is illustrated a simple and satisfactory embodiment of a reduction of the improvement to practice.

In the drawings:

Figure 1 is an illustration of the improvement showing the same supporting three pipes.

Fig. 2 is a side elevation thereof.

Fig. 3 is a sectional view approximately on the line 3—3 of Fig. 2.

Fig. 4 is a view illustrating the device supporting a single pipe.

Fig. 5 is a view illustrating the device supporting two pipes.

Fig. 6 is a perspective view of the hanger.

Fig. 7 is a perspective view of the lowest clamp employed.

Fig. 8 is a similar view of one of the upper clamps employed.

The hanger 5 has an upper bent or angle portion 6 provided with openings for the reception of elements whereby the hanger may be sustained on any desired support. The vertical leg of the hanger, adjacent to the end thereof has a transverse slot 7 therethrough.

In the slot 7 is designed to be received the offset tongue 8 formed centrally upon the U-shaped body 9 of the lower clamp 10. The body 9 is provided with a straight extension 11.

Slidable on the hanger is a bail 12. This bail is designed to engage with the extension 11 of the lower clamp when a pipe 13 is arranged in the body. The frictional engagement between the bail 12 and the extension, as well as the frictional engagement of the bail on the hanger, forces the extension 11 against the hanger, and consequently tightly holds the pipe 13 in the clamp.

Above the bail 12 is a smaller bail 14. This bail is designed to be used when upper clamps 16 are employed, as when two or three pipes are supported from the hanger. The straight extension 11 of the lower clamp 10. is centrally notched as at 15, and each of the upper clamps 16 has an outwardly curved tongue 17 at the end of its U-shaped body 18. These tongues are both designed to be passed through the bail 12, and one of the tongues is designed to be received through the notch in the extension of the lower clamp. The upper clamps are arranged one on each of the opposite sides of the hanger, and as both of the upper clamps are of a similar construction, I have designated the parts thereof by similar numerals. Each of the upper clamps, from its U-shaped body is provided with an extension 19, which is of a width equaling that of the body, and each of the extensions has an opening 20 therethrough designed to register with an opening 21 in the hanger. After the upper bail has been brought over the extensions 20, and after the pipes 22 and 23 are arranged by the upper clamps, a retaining means, such as a cotter pin 24 is passed through the openings 20 in the extensions 19 of the upper clamps and through the opening 21 in the hanger 5. This cotter pin contacts with the upper bail and prevents the same from moving off of the extensions of the upper clamps, which might occur by the vibration of the car in its travel.

What I claim is:

A hanger including a flat leg having a slot adjacent to the bottom thereof and having openings above the slot, pipes arranged against one or both of the faces of the hanger and designed to be supported thereon, clamps for the pipes each comprising a member having a U-shaped body and straight extensions at the end of the body, the straight extension on one end of each of the clamps providing tongues, and the straight extensions on the opposite ends of the clamps being centrally cut away to receive the tongues of the adjacent clamps therein, the tongue of the lowermost clamp designed to be passed through the opening in the hanger, and the straight extension of the uppermost clamp having an aperture therethrough registering with one of the openings in the hanger, securing means passing through the aperture and opening, and bail members arranged to surround the hanger, the straight extension of the uppermost clamp, and the interengaging extensions of the remaining clamps between the pipes.

In testimony whereof I affix my signature.

JOHN A. KOHN.